United States Patent Office 3,189,631
Patented June 15, 1965

3,189,631
ORGANIC MERCURY COMPOUNDS
Herbert C. Stecker, 1 Bridle Way, Ho-Ho-Kus, N.J.
No Drawing. Filed Oct. 29, 1962, Ser. No. 233,861
3 Claims. (Cl. 260—431)

This application is a continuation-in-part of my co-pending application Serial No. 759,845, filed September 9, 1958, now U.S. Patent 3,076,832.

This invention deals with new organic compounds of mercury, useful as fungicides and bactericides for non-therapeutic purposes in the preservation of materials other than foods, and the like. These novel compounds have at least one ether type of bridge linkage, the linkage being effected through a polar element (such as O, P, As, S, N, Sb, etc.) which, although bare of organic radicals, has carried at least two active hydrogen atoms prior to the reaction set forth herein.

The novel compounds of the present invention are produced by reaction of three ingredients, namely, (1) an aliphatic substituted unsaturated hydrocarbon carrying at least one labile negative substituent, (2) an anion-carrying divalent mercury compound, and (3) an organic radical-free compound having at least two active-hydrogen atoms attached to a polar atom selected from the right hand series of Groups V and VI of the periodic table. This latter organic radical-free compound hereinafter shall be referred to as a "bare" compound, i.e., one bare of organic radicals.

According to the present invention, allyl chloride, for example, may be reacted with mercuric oxide in the presence of acetic acid and water (bare active-hydrogen-carrying compound) to produce chloropropyl mercuric acetate ether in accordance with the following reaction:

$2ClCH_2CH{:}CH_2 + H_2O + 2Hg(OOCCH_3)_2 \longrightarrow$

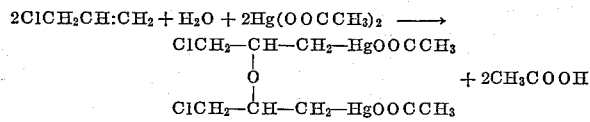

In this case, the labile hydrogens leave the water molecule presumably to form free acetic acid, and the remaining oxygen joins onto the two allyl chloride molecules to form an ether bridge linkage.

Likewise, methallylthiocyanate, mercuric oxide, trichloroacetic acid, and phosphine can combine according to the following reaction:

$2NCS{-}CH{-}CH{:}CH_2 + PH_3 + 2Cl_3CCOOH + 2HgH \longrightarrow$
   |
   $CH_3$

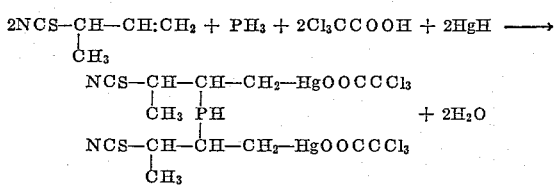

From the foregoing, it is apparent that the first ingredient of the reaction mixture employed for this invention is an aliphatic unsaturated hydrocarbon containing a labile substituent group, such as a halogen. Bernthsen, in his "Textbook of Organic Chemistry," Sudborough edition, D. Van Nostrand Co., 127, page 58, states that halogen substituents, such as chlorine, bromine, iodine and fluorine, are labile or readily-replaceable groups. Other such labile groups found suitable for the purpose of the present invention are SCN, CNS, OCN and CNO groups. Although only one such group must be present, more than one, and up to twenty of such groups may be present. This labile group is necessary for the reaction to proceed substantially to completion in presence of acid, although the group itself does not necessarily undergo any apparent reaction during the formation of the compounds of the present invention. The aforesaid hydrocarbon reacting compound for the reaction may contain other substituents, such as ether linkages, and the like, which do not enter into the reaction involved herein, provided such latter groups do not interfere with the aforesaid desired reaction by steric hindrance, excessive weakening of the unsaturated bond, or otherwise. Hydrocarbon compounds of this type found suitable for this purpose in the reaction set forth herein include allyl chloride, methallyl chloride, propargyl bromide, 2-chloroethylvinyl ether, vinylidene iodide, vinyl bromide, oleyl fluoride, perchlorododecyl vinyl ether, oleyl iodide, allyl thiocyanate, allyl isothiocyanate, methallyl isothiocyanate and the like. It is preferred that such unsaturated hydrocarbons have 2 to 30 carbon atoms per molecule, although the most desirable ones at the present time have 2 to 10 carbon atoms per molecule. These latter hydrocarbon compounds may be straight chain or branched, provided the unsaturation is in reactive form.

The second ingredient in the reaction mixture is a divalent mercury compound carrying an anion, such as mercuric acetate, mercuric stearate, mercuric bromide, mercuric chloride, mercuric hydroxyacetate, mercuric phosphate, mercuric propionate, mercuric nonoate, mercuric sulfate, mercuric borate, mercuric malonate, mercuric trichloroacetate, mercuric terephthalate, mercuric hydroxyacetate, and the like. It is preferable first to start with a low molecular weight organic acid such as acetic, and then, if an inorganic salt or salt of a sluggishly acting organic acid (such as nonoic) is desired, the latter acid is added later, when a salt exchange occurs. These mercury compounds may be formed in situ during the reaction, by use of mercuric oxide (HgO), using the appropriate anion-forming acid, such as acetic, propionic, hydroxyacetic, and like acid, it being understood that the acid employed would not make the mercury unreactive or too slowly reactive for the purpose of the present invention. The in situ formation of the mercury compound often is more preferable, as it aids in controlling the extent of the reaction, as will be explained hereinafter.

The third ingredient in the reaction mixture is a bare active-hydrogen compound, i.e., an active hydrogen compound which is free of organic radicals on the active-hydrogen-carrying polar element. Such active-hydrogen compounds may be water, hydrogen sulfide, arsine, ammonia, phosphine, hydrogen selenide, stibine, and other bare compounds of the right hand elements of Groups V and VI of the Periodic Table, carrying at least two active hydrogens, and thus capable of forming an ether-type bridge in the reaction product. For example, such polar elements in Group V would be N, P, As, Sb, etc., while those in Group VI would be O, S, Se, Te, etc. Elements having atomic numbers of not over 52 are most desirable.

According to the present invention, allyl chloride, phosphine and mercuric trichloroacetate react in the following manner:

$2ClCH_2.CH{:}CH_2 + PH_3 + 2Hg(OOCCCl_3)_2 \longrightarrow$

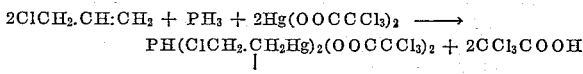

The bridging of the phosphorus plus its unreacted hydrogen atom takes place at the dangling valence indicated, while the reacted active hydrogens of the phosphine enter into water formation. This reaction may be written empirically, as follows:

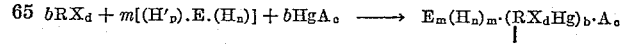

wherein R represents an unsaturated hydrocarbon compound containing the labile substituents $X_d$, E represents the bare element carrying the reacting active hydrogen atoms ($H_n$) and the non-reacting active hydrogen atoms ($H'_p$), Hg represents an atom of divalent mercury, $b$ represents the reacting valence (or number of active hydrogens) of the bare element and thus is equivalent to the number of mercury atoms reacting, A represents the anion salt portion attached to the bivalent mercury atom, c represents the number of mercury anions reacting, and m represents the number of E's reacting. For example, if $RX_m$ is perchlorododecyl vinyl ether, then m has a value of 20. R, which represents a hydrocarbon group carrying labile substituent X, has 2 to 30 carbon atoms. The number of substituents d can vary from 1 to 20.

For example, if allyl trichloride was reacted with two of the active hydrogen atoms of phosphine, and with mercury phosphate, the following reaction would take place:

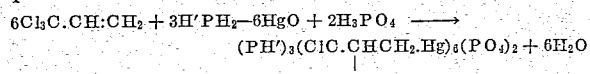

Since the bridging of the PH takes place at the dangling valence, the reaction product can have the structure as follows:

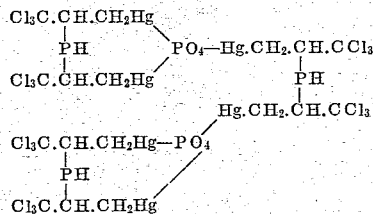

In the event methallyl chloride was reacted with all three of the active hydrogen atoms of arsine, and with mercury phosphate, the following reaction would take place:

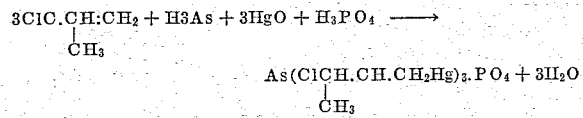

And the reaction product can have the structural formula as follows:

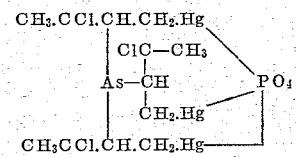

These novel compounds may be produced simply by mixing the specified substituted unsaturated hydrocarbon compound with the specified mercuric salt or with mercuric oxide and an acid corresponding to the salt, with the precautions already mentioned, in the presence of the desired bare active hydrogen compound. The acid also may be employed in excess as the reaction solvent. According to the general procedure, mercuric oxide is dissolved in acetic acid and the water, for example, or the hydride of the polar element (phosphine, arsine, hydrogen sulfide, hydrogen selenide, ammonia, or stibine) is bubbled through or otherwise added, as in solution form dissolved in acetic acid solvent (to prevent reduction of the mercury compound), with further acetic acid in the molar amount required for production of the particular product, as indicated in Table I. The reaction preferably is done at low temperature, say just above the melting point of the acetic acid. The unsaturated hydrocarbon containing a labile substituent (e.g., allyl chloride) is then added to the reaction mixture, using an excess of acetic acid as the reaction medium. It will be noted in Examples 13–17 of Table I, that the reaction first is carried out with acetic acid, after which the slow-reacting acid is added, whereupon a salt interchange occurs. Reaction is conducted at low temperature, after which the mixture is heated to 60° C. and filtered. The product separates on cooling the filtrate, but further separation may be accomplished by dilution of the filtrate with water.

In the case of compounds wherein all of the active hydrogens are reacted, such as those illustrated by Example 1 of Table I, it is considered necessary to add more than the theoretically required quantity of water in order to produce a better yield.

There is usually a liberation of heat during the stirring operation, after which the product may be recovered by precipitation, evaporation of the solvent, or by drying from the frozen state. The products formed vary from highly volatile to relatively non-volatile liquids and crystalline or amorphous solids. When using mercuric chloride and other mercury salts which tend to react slowly or incompletely, reaction may be carried out as specially outlined above.

As stated previously, although R has been specified as a specially-substituted hydrocarbon group, it is to be understood that this group may contain one or more substituents which do not enter into the reaction of the present invention and which do not interfere with said reaction by steric hindrance, excessive weakening of the unsaturated bond of the reacting parent substituted unsaturated hydrocarbon, or otherwise. Such other substituents may include halogens, ether-linked groups, nitro groups, as well as other known groups.

Although the mercury salt, as such, may be added slowly to the other reactants in the solvent to prepare the products of the present invention, it has been found that control of the reaction is more easily obtained by addition of mercuric oxide to the other reactants, including the acid reactable with the oxide, and the solvent, as outlined in Example 1 of Table I, with the precautions, already mentioned, being observed.

Biological tests on compounds made in accordance with the present invention have shown that their activity, in relation to phenyl mercury acetate (the present standard of organo-mercury compounds), is, on the average, over 23% greater, i.e., they require 23% less mercury metal by weight in the treating compositions to produce the same biocidal effect, while fact results in a decidedly favorable economic advantage in view of the high cost of mercury. Although the reason for this is not entirely established, it is believed that the high biocidal activity of the compounds of the present invention is attributable in part, at least, to the presence in the molecule of a labile activating atom (e.g., a halogen atom) together with a lipophyllic group (e.g., an ether linkage) which, with other concommitant portions of the molecule, enable more effective penetration of the mercury atom through the cell wall of the mircoorganism.

Among other advantages of the compounds of the present invention are simplicity of manufacture, employment of less equipment, and high yields resulting in lower material costs. Furthermore, molecular structures may be synthesized having characteristics specifically desired for the biocidal problem encountered.

The examples given herein and in Table I present a series of compounds prepared in accordance with the present invention. Their biocidal activity is given as the precentage of that obtained with PMA (phenyl mercuric acetate). This comparative biological activity was determined by use of "Difco" nutrient agar, inoculated with Staphylococcus aureus and poured into Petri dish plates. Zones of inhibition were determined in triplicate for each product after a 24-hour incubation period at 3 concentration levels so as to determine points from which a straight line could be drawn on graph paper, plotting zones of inhibition, in millimeters, against concentration in parts per million. By interpolation on this line as determined for each product, a concentration could be found at which the product gave the same zone size as a standard concentration of PMA, and the comparative activity of the particular product could thus be deduced. For example, if PMA at 1000 p.p.m. produced a zone inhibition measuring 24 mm., and it was found that the same zone size was obtainable with the new compound at 500 p.p.m., then this new product would be considered to be 100% more effective than PMA.

This invention may be more readily understood by reference to the following examples which depict many phases of the present invention:

EXAMPLE 1

Two moles of allyl chloride, about 10 moles of water, two moles of mercuric oxide and two moles of acetic acid were reacted by adding the mercuric oxide slowly with stirring to the mixture of other compounds in excess acetic acid as solvent. After 30 minutes (when all mercuric oxide was consumed), the reaction mass was warmed and stirred until no inorganic mercury ions were detectable by the addition of a small test portion to dilute NaOH solution. The resulting product was found to have the empirical formula $C_{10}H_{16}O_5Hg_2Cl_2$, and was obtained in quantitative yield after stripping off of the solvent. It was identified as:

Cl—CH$_2$—CH—CH$_2$·HgOOCCH$_3$
          |
          O
          |
Cl—CH$_2$—CH—CH$_2$·HgOOCCH$_3$

The determined molecule weight of the compound obtained was 688. The calculated amount of mercury was 58.3%. Actually, 58.2% was found. Its biological activity over that of phenyl mercury acetate (PMA) was 53.3%.

EXAMPLE 2

Two moles of allyl chloride, two moles of acetic acid, two moles of mercuric oxide and one mole of hydrogen sulfide were reacted in excess acetic acid solvent, at about the melting point of acetic acid, as in Example 1. When the reaction was completed, the product was recovered, acetic acid was again added and the mixture was allowed to warm up to room temperature and stand over night. The separated compound was found to have a molecular weight of 704. The compound had an empirical fomula of $C_{10}H_{16}O_4Hg_2SCl_2$, and was found to be the following compound:

ClCH$_2$CH.CH$_2$.HgOOCCH$_3$
          |
          S
          |
ClCH$_2$CH.CH$_2$.HgOOCCH

EXAMPLE 3

Into a mixture of two moles of methyallylthiocyanate, two moles of mercuric oxide, and three moles of trichloroacetic acid, phosphine dissolved in acetic acid was added while stirring at low temperature until one mole of the phosphine was reacted. The compound, recovered as in Example 1, had an empirical formula of $$C_{14}H_{15}O_4Hg_2S_2PN_2Cl_6$$

and a molecular weight of 984. It was identified as:

NCS—CH—CH—CH$_2$.HgOOCCCl$_3$
         |    |
         CH$_3$ PH
              |
NCS—CH—CH—CH$_2$.HgOOCCCl$_3$
         |
         CH$_3$

The compound had a biological activity of 46.7% over that of PMA, based on the mercury content.

*Table I*

| Reacting components | Compound formed | General formula | MW | Percent Hg Calculated | Percent Hg Found | Biological activity Ratio to corresp. phenyl Hg salt | Biological activity Percent activity over that of PMA, basis Hg content |
|---|---|---|---|---|---|---|---|
| 1. Allyl chloride<br>Mercuric oxide<br>Acetic acid<br>Water | Cl—CH$_2$—CH—CH$_2$HgOOCCH$_3$<br>         \|<br>         O<br>         \|<br>Cl—CH$_2$—CH—CH$_2$HgOOCCH$_3$ | $C_{10}H_{16}O_5Hg_2Cl_2$ | 688 | 58.3 | 58.2 | 2.09 | 53.3 |
| 2. Methallylthiocyanate<br>Mercuric oxide<br>Trichloracetic acid<br>Phosphine (½ mole) | CH$_3$<br>\|<br>NCS—CH—CH—CH$_2$HgOOCCCl$_3$<br>            \|<br>            PH<br>            \|<br>NCS—CH—CH—CH$_2$HgOOCCCl$_3$<br>         \|<br>         CH$_3$ | $C_{14}H_{15}O_4Hg_2S_2PN_2Cl_6$ | 984 | 40.8 | 40.7 | 1.29 | 33.1 |
| 3. Allyl chloride<br>Mercuric oxide<br>Acetic acid<br>Phosphine (⅓ mole) | Cl—CH$_2$CH—CH$_2$HgOOCCH$_3$<br>         \|<br>         P——CH—CH$_2$HgOOCCH$_3$<br>         \|    \|<br>         \|    CH$_2$<br>Cl—CH$_2$—CH   Cl<br>         \|<br>         CH$_2$<br>         \|<br>         Hg—OOCCH$_3$ | $C_{15}H_{24}O_6Hg_3PCl_3$ | 1,040 | 57.8 | 57.5 | 1.23 | 23.3 |
| 4. Allyl chloride<br>Mercuric oxide<br>Acetic acid<br>Arsine (½ mole) | Cl—CH$_2$CH—CH$_2$HgOOCCH$_3$<br>         \|<br>         AsH<br>         \|<br>Cl—CH$_2$CH—CH$_2$HgOOCCH$_3$ | $C_{10}H_{17}O_4Hg_2AsCl_2$ | 748 | 53.6 | 53.4 | 1.26 | 20.5 |
| 5. Allyl chloride<br>Mercuric oxide<br>Acetic acid<br>Arsine (⅓ mole) | Cl—CH$_2$—CH—CH$_2$HgOOCCH$_3$<br>         \|<br>         As——CH—CH$_2$HgOOCCH$_3$<br>         \|    \|<br>Cl—CH$_2$—CH   CH$_2$<br>         \|    \|<br>         CH$_2$  Cl<br>         \|<br>         Hg—OOCCH$_3$ | $C_{15}H_{24}O_6Hg_3AsCl_3$ | 1,084 | 55.6 | 55.5 | 1.28 | 24.1 |
| 6. Allyl chloride<br>Mercuric oxide<br>Acetic acid<br>Hydrogen sulfide | Cl—CH$_2$—CH—CH$_2$HgOOCCH$_3$<br>         \|<br>         S<br>         \|<br>Cl—CH$_2$—CH—CH$_2$HgOOCCH$_3$ | $C_{10}H_{16}O_4Hg_2Cl_2$ | 704 | 57.0 | 56.8 | 1.67 | 42.1 |

Table 1—Continued

| Reacting components | Compound formed | General formula | MW | Percent Hg Calculated | Percent Hg Found | Biological activity Ratio to corresp. phenyl Hg salt | Biological activity Percent activity over that of PMA, basis Hg content |
|---|---|---|---|---|---|---|---|
| 7. Methallyl chloride<br>Mercuric oxide<br>Acetic acid<br>Hydrogen selenide | $\text{CH}_3$<br>\|<br>$\text{Cl-CH-CH-CH}_2\text{HgOOCCH}_3$<br>\|<br>Se<br>\|<br>$\text{Cl-CH-CH-CH}_2\text{HgOOCCH}_3$<br>\|<br>$\text{CH}_3$ | $C_{12}H_{20}O_4Hg_2SeCl_2$ | 779 | 52.8 | 52.4 | 1.28 | 25.0 |
| 8. Allyl chloride<br>Mercuric oxide<br>Acetic acid<br>Ammonium acetate (½ mole) | $\text{Cl-CH}_2\text{-CH-CH}_2\text{HgOOCCH}_3$<br>\|<br>NH<br>\|<br>$\text{Cl-CH}_2\text{-CH-CH}_2\text{HgOOCCH}_3$ | $C_{10}H_{17}O_4HgNCl_2$ | 687 | 58.4 | 58.5 | 2.05 | 52.5 |
| 9. Allyl chloride<br>Mercuric oxide<br>Acetic acid<br>Ammonium acetate (⅓ mole) | $\text{Cl-CH}_2\text{-CH-CH}_2\text{HgOOCCH}_3$<br>\|<br>$\text{N---CH-CH}_2\text{HgOOCCH}_3$<br>\|    \|<br>\|    $\text{CH}_2$<br>$\text{Cl-CH}_2\text{-CH Cl}$<br>\|<br>$\text{CH}_2$<br>\|<br>$\text{Hg-OOCCH}_3$ | $C_{15}H_{24}O_6Hg_3NCl_3$ | 1,023 | 58.8 | 58.6 | 1.28 | 22.5 |
| 10. Allyl chloride<br>Mercuric oxide<br>Acetic acid<br>Stibine (½ mole) | $\text{Cl-CH}_2\text{-CH-CH}_2\text{HgOOCCH}_3$<br>\|<br>SbH<br>\|<br>$\text{Cl-CH}_2\text{-CH-CH}_2\text{HgOOCCH}_3$ | $C_{10}H_{17}O_4Hg_2SbCl_2$ | 795 | 50.4 | 49.8 | 0.96 | 6. |
| 11. Allyl chloride<br>Mercuric oxide<br>Acetic acid<br>Stibine (⅓ mole) | $\text{Cl-CH}_2\text{-CH-CH}_2\text{HgOOCCH}_3$<br>\|<br>$\text{Sb---CH-CH}_2\text{HgOOCCH}_3$<br>\|   \|<br>$\text{Cl-CH}_2\text{-CH CH}_2$<br>\|<br>$\text{CH}_2$ Cl<br>\|<br>$\text{HgOOCCH}_3$ | $C_{15}H_{24}O_6Hg_3SbCl_3$ | 1,131 | 53.2 | 53.0 | 1.26 | 23.3 |
| 12. Allyl isothiocyanate<br>Mercuric oxide<br>Hydroxyacetic acid<br>Water | $\text{SCN-CH}_2\text{-CH-CH}_2.\text{HgOOCCH}_2\text{OH}$<br>\|<br>O<br>\|<br>$\text{SCH-CH}_2\text{-CH-CH}_2.\text{HgOOCCH}_2\text{OH}$ | $C_{12}H_{16}O_7Hg_2S_2N_2$ | 765 | 52.4 | 52.6 | 1.65 | 45.3 |
| 13. Vinyl bromide<br>Mercuric oxide<br>Malonic acid<br>Acetic acid<br>Water | $\text{BrCH-CH.Hg-O-C}\overset{O}{\overset{\|}{\phantom{X}}}$<br>              $\text{CH}_2$<br>$\text{BrCH-CH.Hg-O-C}\overset{O}{\overset{\|}{\phantom{X}}}$ | $C_7H_6O_5Hg_2Br_2$ | 731 | 54.9 | 54.5 | 2.01 | 55.0 |
| 14. Oleyl iodide<br>Mercuric oxide<br>Phosphoric acid (ethyl ester)<br>Acetic acid<br>Water | $\text{I(CH}_2\text{)}_8\text{-CH-CH.Hg-O-P-OH}$<br>           $\text{O C}_2\text{H}_5$<br>    $\text{O (CH}_2\text{)}_7$<br>$\text{I(CH}_2\text{)}_8\text{-CH-CH.Hg-O-P}$<br>      $(\text{CH}_2)_7$   $\text{O C}_2\text{H}_5$ | $C_{38}H_{76}O_9Hg_2P_2I_2$ | 1,357 | 29.6 | 29.1 | 1.14 | 25.2 |
| 15. 2-fluoroethylvinyl ether<br>Mercuric acetate<br>Sodium terephthalate (hemi salt)<br>Acetic acid<br>Arsine | $\text{O-C}_2\text{H}_4\text{F}$<br>\|<br>$\text{CH-CH}_2.\text{HgOOC}\langle\rangle\text{COONa}$<br>\|<br>AsH<br>\|<br>$\text{CH-CH}_2.\text{HgOOC}\langle\rangle\text{COONa}$<br>\|<br>$\text{O-C}_2\text{H}_4\text{F}$ | $C_{24}H_{23}O_{10}Hg_2AsF_2Na_2$ | 1,031 | 38.9 | 39.0 | 1.20 | 25.5 |
| 16. Vinylidene chloride<br>Mercuric oxide<br>Nonoic acid<br>Acetic acid<br>Stibine | $\text{Cl}_2\text{-C-CH}_2.\text{HgOOC(CH}_2\text{)}_7\text{CH}_3$<br>\|<br>AsH<br>\|<br>$\text{Cl}_2\text{-C-CH}_2.\text{HgOOC(CH}_2\text{)}_7\text{CH}_3$ | $C_{22}H_{39}O_4Hg_2AsCl_4$ | 985 | 40.7 | 40.3 | 1.15 | 19.2 |
| 17. Vinyl chloride<br>Mercuric oxide<br>Boric acid<br>Acetic acid<br>Water | $\text{Cl-CH-CH}_2.\text{HgH}_2\text{BO}_3$<br>\|<br>O<br>\|<br>$\text{Cl-CH-CH}_2.\text{HgH}_2\text{BO}_3$ | $C_4H_{10}O_7Hg_2B_2Cl_2$ | 664 | 60.4 | 60.3 | 2.03 | 50.2 |

I claim:
1. An ether type bridge linkage-containing organic compound reaction product of a mercuric anionic salt, a bare active-hydrogen-carrying compound having at least two active hydrogen atoms, and an aliphatic mono olefine carrying at least one labile substituent group, said reaction product having the formula:

$$E_m(H_n)_m(RX_dHg)_bA_c$$

wherein:
  R represents a saturated hydrocarbon group carrying 2 to 30 carbon atoms,
  X represents a labile substituent on R, selected from the radicals consisting of halogen, SCN, CNS, OCN and CNO,
  E represents a bare element serving as a bridge and selected from the class consisting of right hand elements of Groups V and VI of the Periodic Table, other than oxygen,
  H represents an unreacted active hydrogen atom remaining on E,
  Hg represents an atom of divalent mercury,
  A represents an anion salt portion attached to the mercury atom,
  $b$ represents the number of mercury atoms, and is a numeral from 2 to 6,
  $c$ represents the number of anions A, and is a numeral from 1 to 3,
  $d$ represents the number of labile substituents X, and is a numeral from 2 to 20.
  $m$ represents the number of E's reacting, and is a numeral from 1 to 3, and
  $n$ represents the number of unreacted active hydrogen atoms remaining on element E, and is a numeral from 0 to 1.

2. An ether type bridge linkage-containing organic compound reaction product having the formula:

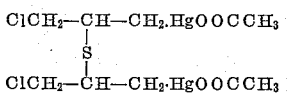

3. An ether type bridge linkage-containing organic compound reaction product having the formula:

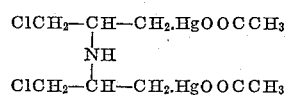

References Cited by the Examiner

Berichte der Deutschen Chemischem Gesellschaft, 33 (1900), pages 1340–1364 (pages 1340–42 and 1350–53 relied on).

TOBIAS E. LEVOW, *Primary Examiner.*